United States Patent
Adachi (10) Patent No.: US 12,504,963 B2
(45) Date of Patent: Dec. 23, 2025

(54) ONBOARD APPARATUS AND UPDATING METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Naoki Adachi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 211 days.

(21) Appl. No.: 18/261,745

(22) PCT Filed: Jan. 5, 2022

(86) PCT No.: PCT/JP2022/000104
§ 371 (c)(1),
(2) Date: Jul. 17, 2023

(87) PCT Pub. No.: WO2022/153897
PCT Pub. Date: Jul. 21, 2022

(65) Prior Publication Data
US 2024/0004634 A1    Jan. 4, 2024

(30) Foreign Application Priority Data
Jan. 18, 2021 (JP) .................................. 2021-005987

(51) Int. Cl.
*G06F 8/65*        (2018.01)

(52) U.S. Cl.
CPC ...................................... *G06F 8/65* (2013.01)

(58) Field of Classification Search
CPC ............ G06F 8/65; H04L 12/28; H04L 12/40
See application file for complete search history.

(56) References Cited

U.S. PATENT DOCUMENTS

2015/0055473 A1   2/2015   Moriya
2015/0301822 A1   10/2015   Takahashi et al.
(Continued)

FOREIGN PATENT DOCUMENTS

CN        118590340 A   *   9/2024
JP        2008-211644 A     9/2008
(Continued)

OTHER PUBLICATIONS

International Search Report, Application No. PCT/JP2022/000104, mailed Mar. 22, 2022. ISA/Japan Patent Office.

*Primary Examiner* — Daxin Wu
(74) *Attorney, Agent, or Firm* — Honigman LLP (57) ABSTRACT

An onboard apparatus is an onboard apparatus that performs processing for updating a program of an onboard ECU that is mounted in a vehicle, and includes: a control unit that controls transmission of a frame of an update program to the onboard ECU, and a storage unit that stores a history of a bus load on a bus for transmitting the frame of the update program to the onboard ECU, and the control unit derives, based on the history, a transmission cycle for transmitting the frame of the update program to the onboard ECU, before the frame of the update program is transmitted, and transmits the frame of the update program to the onboard ECU based on the derived transmission cycle.

9 Claims, 7 Drawing Sheets

(56) References Cited

U.S. PATENT DOCUMENTS

| | | | |
|---|---|---|---|
| 2018/0218158 A1* | 8/2018 | Amano | H04L 12/40006 |
| 2018/0295147 A1* | 10/2018 | Haga | H04L 67/12 |
| 2019/0050296 A1* | 2/2019 | Luo | G06F 11/1456 |
| 2020/0050378 A1 | 2/2020 | Sakurai et al. | |
| 2020/0050442 A1 | 2/2020 | Sakurai et al. | |
| 2020/0053112 A1* | 2/2020 | Torisaki | H04L 63/1425 |
| 2020/0183676 A1 | 6/2020 | Sakurai et al. | |
| 2020/0241771 A1 | 7/2020 | Sakurai et al. | |
| 2020/0249930 A1* | 8/2020 | Abe | G06F 9/4401 |
| 2021/0083950 A1* | 3/2021 | Bentley | H04L 69/40 |
| 2021/0155176 A1 | 5/2021 | Harata et al. | |
| 2021/0157529 A1 | 5/2021 | Sakurai et al. | |
| 2021/0157566 A1 | 5/2021 | Sakurai et al. | |
| 2021/0157567 A1 | 5/2021 | Sakurai et al. | |
| 2021/0157568 A1 | 5/2021 | Sakurai et al. | |
| 2021/0157571 A1 | 5/2021 | Ogawa et al. | |
| 2021/0157572 A1 | 5/2021 | Harata et al. | |
| 2021/0157575 A1 | 5/2021 | Ogawa et al. | |
| 2021/0157902 A1 | 5/2021 | Sakurai et al. | |
| 2022/0012043 A1 | 1/2022 | Sakurai et al. | |
| 2022/0385553 A1* | 12/2022 | Adachi | H04L 69/40 |
| 2022/0413833 A1* | 12/2022 | Kodama | G06F 13/00 |
| 2022/0416825 A1* | 12/2022 | Yasunori | B60R 16/0231 |

FOREIGN PATENT DOCUMENTS

| | | | | |
|---|---|---|---|---|
| JP | 7500925 B2 * | 6/2024 | | B60R 16/023 |
| WO | 2018-051833 A1 | 3/2018 | | |
| WO | WO-2019202965 A1 * | 10/2019 | | B60R 16/023 |

* cited by examiner

ONBOARD APPARATUS AND UPDATING METHOD

CROSS-REFERENCE TO RELATED APPLICATIONS

This application is the U.S. national stage of PCT/JP2022/000104 filed on Jan. 5, 2022, which claims priority of Japanese Patent Application No. JP 2021-005987 filed on Jan. 18, 2021, the contents of which are incorporated herein.

TECHNICAL FIELD

The present disclosure relates to an onboard apparatus and an updating method.

BACKGROUND

A plurality of onboard ECUs (Electronic Control Units) for controlling onboard devices such as powertrain devices for engine control and the like and body devices for air-conditioner control and the like, and onboard apparatuses connected to the onboard ECUs are mounted in a vehicle. The onboard apparatuses and the onboard ECUs are connected via buses. An onboard apparatus obtains an update program for an onboard ECU from an external server outside the vehicle. The onboard apparatus transmits the obtained update program to the onboard ECU via the bus in order to update the program of the onboard ECU (for example, JP 2020-27669A).

An onboard apparatus and an onboard ECU in JP 2020-27669A may transmit/receive data other than an update program with each other via the bus. When transmission of the update program and transmission/reception of data other than the update program are performed, the bus load on the bus is large. When the bus load is large, there is a risk that a portion of the update program that is being transmitted or a portion of the above data that is being transmitted/received will be lost. In addition, there is a risk that communication between the onboard apparatus and the onboard ECU will be delayed.

The present disclosure has been made in view of the aforementioned circumstances, and an object thereof is to provide an onboard apparatus and the like that can transmit an update program to an onboard ECU such that an upper limit value of a bus load is not exceeded, even when transmission of the update program and transmission/reception of data other than the update program are performed.

SUMMARY

An onboard apparatus according to an aspect of the present disclosure is an onboard apparatus that performs processing for updating a program of an onboard ECU that is mounted in a vehicle, the onboard apparatus including: a control unit configured to control transmission of a frame of an update program to the onboard ECU, and a storage unit configured to store a history of a bus load on a bus for transmitting the frame of the update program to the onboard ECU, and the control unit deriving, based on the history, a transmission cycle for transmitting the frame of the update program to the onboard ECU, before the frame of the update program is transmitted, and transmitting the frame of the update program to the onboard ECU based on the derived transmission cycle.

Advantageous Effects

According to an aspect of the present disclosure, it is possible to transmit an update program to an onboard ECU such that an upper limit value of a bus load is not exceeded, even when transmission of the update program and transmission/reception of data other than the update program are performed.

DETAILED DESCRIPTION OF PREFERRED EMBODIMENTS

First, embodiments of the present disclosure will be listed and described. In addition, at least some of the embodiments described below may be combined as appropriate.

An onboard apparatus according to an aspect of the present disclosure is an onboard apparatus that performs processing for updating a program of an onboard ECU that is mounted in a vehicle, the onboard apparatus including: a control unit configured to control transmission of a frame of an update program to the onboard ECU, and a storage unit configured to store a history of a bus load on a bus for transmitting the frame of the update program to the onboard ECU, and the control unit deriving, based on the history, a transmission cycle for transmitting the frame of the update program to the onboard ECU, before the frame of the update program is transmitted, and transmitting the frame of the update program to the onboard ECU based on the derived transmission cycle.

In this aspect, the onboard apparatus transmits an update program as a plurality of frames to the onboard ECU. The onboard apparatus and the onboard ECU also transmit/receive data other than the update program to/from each other via the bus. When the update program is transmitted, the control unit derives a transmission cycle of the frames of the update program based on the history of the bus load. The control unit transmits the frames of the update program based on the derived transmission cycle, and thus, even when data other than the update program is being transmitted/received, it is possible to prevent the bus load from becoming too large. Even when transmission of the update program and transmission/reception of data other than the update program are performed, the control unit can transmit the update program to the onboard ECU such that an upper limit value of a bus load is not exceeded.

In the onboard apparatus according to an aspect of the present disclosure, the control unit derives the transmission cycle based on the bus load and a relation between bus load and transmission cycle stored in advance.

In this aspect, the relation between bus load and transmission cycle is stored in advance. The control unit derives the transmission cycle of the frame of the update program based on the above relation and the bus load. The control unit can derive a transmission cycle for any bus load that occurs on the bus, by using the above relation. The control unit can transmit the frames of the update program to the onboard ECU while effectively utilizing the bus to the upper limit value of the bus load, and thus can efficiently transmit the update program to the onboard ECU.

In the onboard apparatus according to an aspect of the present disclosure, the control unit derives the transmission cycle based on the bus load, an estimated bus load estimated to occur due to transmission/reception of an unexpected frame other than the frame of the update program, and the relation.

In this aspect, a bus load that occurs on the bus due to transmission/reception of an unexpected frame is estimated as an estimated bus load in advance. The unexpected frame is a so-called event frame. The control unit derives a transmission cycle based on the relation between bus load and transmission cycle, the bus load, and the estimated bus load. The transmission cycle is derived in consideration of the estimated bus load, and thus, even in a case where an unexpected frame is transmitted/received while the control unit is transmitting the frames of the update program to the onboard ECU, the control unit can transmit the frames of the update program to the onboard ECU such that the upper limit value of the bus load is not exceeded.

In the onboard apparatus according to an aspect of the present disclosure, the control unit detects the bus load, compares the detected bus load with the bus load included in the history, derives the transmission cycle based on the detected bus load if the detected bus load is larger than the bus load included in the history, and derives the transmission cycle based on the bus load included in the history if the detected bus load is smaller than or equal to the bus load included in the history.

In this aspect, the control unit detects a bus load, and compares the detected bus load with the bus load included in the history. If the detected bus load is larger than the bus load included in the history, the control unit derives a transmission cycle based on the detected bus load. Also, if the detected bus load is smaller than or equal to the bus load included in the history, the control unit derives a transmission cycle based on the bus load included in the history. Even if the detected bus load is larger than the bus load included in the history, the control unit can derive an appropriate transmission cycle.

In the onboard apparatus according to an aspect of the present disclosure, the history includes a largest value of the bus load during a period that excludes a transmission period of the frame of the update program, and the control unit derives the transmission cycle based on the largest value.

In this aspect, the history includes the largest value of bus loads during a period that excludes a transmission period of the update program. When deriving a transmission cycle based on the history, the control unit uses the largest value of bus loads included in the history. By deriving a transmission cycle based on the largest value of bus loads, the control unit can effectively prevent the bus load from becoming too large, even in a case where data other than the update program is being transmitted/received when the frame of the update program is transmitted to the onboard ECU.

In the onboard apparatus according to an aspect of the present disclosure, the control unit calculates a time required for transmitting the update program to the onboard ECU, based on a data amount of the update program and the derived transmission cycle, and causes a display unit provided in the vehicle to display the calculated time.

In this aspect, the control unit calculates a time required for transmitting the update program to the onboard ECU, and causes a display unit such as a display provided in the vehicle to display the calculated time. The control unit can notify an occupant such as the driver of the vehicle, of the time required for transmitting the update program to the onboard ECU.

In the onboard apparatus according to an aspect of the present disclosure, the control unit outputs the derived transmission cycle to a terminal that calculates a time required for transmitting the update program to the onboard ECU, based on the data amount of the update program and the transmission cycle.

In this aspect, the control unit outputs the derived transmission cycle to the terminal. The terminal calculates a time required for transmitting the update program to the onboard ECU, based on the data amount of the update program and the output transmission cycle. It is possible to notify an owner of the terminal, such as a worker who performs maintenance work of the vehicle, for example, of the time required for transmitting the update program to the onboard ECU.

In the onboard apparatus according to one aspect of the present disclosure, the control unit obtains information regarding whether or not to execute transmission of the frame of the update program to the onboard ECU, and, in accordance with the received information regarding whether or not to execute transmission of the frame of the update program to the onboard ECU, executes transmission of the frame of the update program to the onboard ECU, or cancels transmission of the frame of the update program to the onboard ECU.

In this aspect, the control unit obtains information regarding whether or not to execute transmission of the frame of the update program to the onboard ECU. If the obtained information indicates to execute transmission of the frame of the update program to the onboard ECU, the control unit transmits the frame of the update program to the onboard ECU based on the derived transmission cycle. The program of the onboard ECU is updated. If the obtained information indicates to not execute transmission of the frame of the update program to the onboard ECU, the control unit does not transmit the frame of the update program to the onboard ECU. The program of the onboard ECU is not updated. The onboard apparatus can execute or cancel updating of the program of the onboard ECU in accordance with the information regarding whether or not to execute transmission of the frame of the update program to the onboard ECU.

An updating method according to an aspect of the present disclosure includes: deriving a transmission cycle for transmitting a frame of an update program to an onboard ECU, based on a history of a bus load on a bus for transmitting the frame of the update program to the onboard ECU, before transmitting the frame of the update program, and transmitting the frame of the update program to the onboard ECU based on the derived transmission cycle.

In this aspect, similarly to the aspect (1), it is possible to transmit the update program to the onboard ECU such that the upper limit value of the bus load is not exceeded, even when transmission of the update program and transmission/reception of data other than the update program are performed.

DETAILED EMBODIMENTS OF PRESENT DISCLOSURE

The present disclosure will be described in detail with reference to the drawings illustrating embodiments of the present disclosure. An onboard apparatus according to an embodiment of the present disclosure will be described below with reference to the drawings. Note that the present disclosure is not limited to these examples, but is defined by the claims and intended to include all modifications within the meaning and scope equivalent to the claims.

First Embodiment

Figure 1:
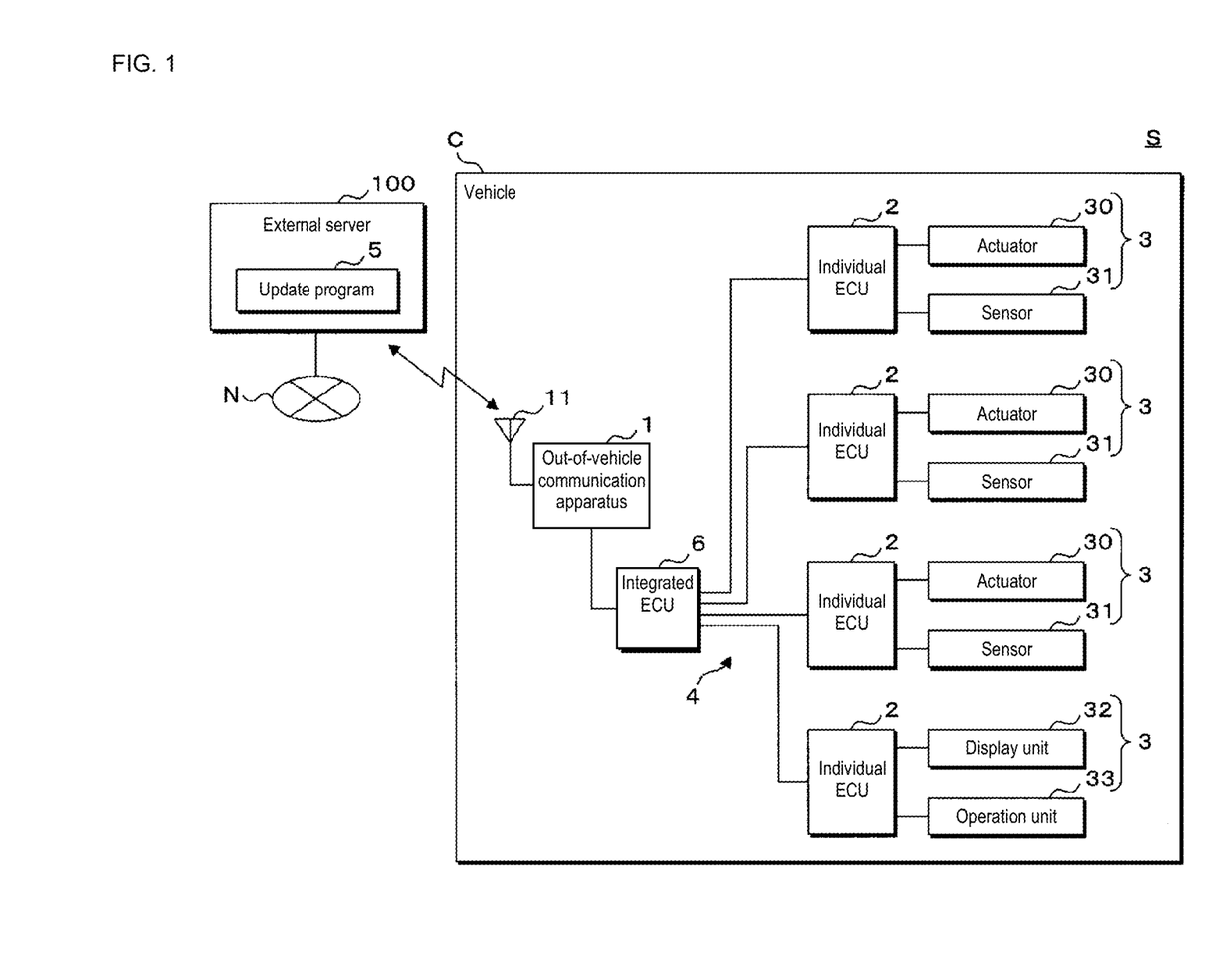
FIG. 1 is a schematic diagram illustrating a system configuration of an onboard system according to a first embodiment.

An embodiment will be described below with reference to the drawings. FIG. 1 is a schematic diagram illustrating a system configuration of an onboard system according to a first embodiment. The onboard system includes an integrated ECU 6 mounted in a vehicle C, a plurality of individual ECUs 2, and onboard devices 3 connected to the individual ECUs 2. The integrated ECU 6 and the individual ECUs 2 are connected via buses 4.

The individual ECUs 2 are disposed in areas in the vehicle C. The individual ECUs 2 transmit/receive signals or data to/from the plurality of onboard devices 3 connected to the individual ECUs 2. Also, the individual ECUs 2 perform communication with the integrated ECU 6.

Examples of the onboard devices 3 include various sensors 31 including a LiDAR (Light Detection and Ranging) sensor, a light sensor, a CMOS camera, and an infrared sensor, a door opening/closing apparatus, and an actuator 30 such as a motor apparatus. Furthermore, the onboard devices 3 include a display unit 32 and an operating unit 33 provided in the vehicle C. The display unit 32 is a display of a car navigation system, for example. The operating unit 33 is a touch panel, for example. The operating unit 33 accepts an operation performed by an occupant such as the driver of the vehicle C. The display unit 32 and the operating unit 33 are integrally configured, for example. In FIG. 1, the display unit 32 and the operating unit 33 are connected to the integrated ECU 6 via one individual ECU 2. The onboard devices 3 are not limited to the above examples, and may be a switch such as a door SW (switch) or may be a lamp SW.

An individual ECU 2 performs drive control of the onboard devices 3. The individual ECU 2 obtains an output signal output from the sensor 31, and transmit a request signal generated based on the obtained output signal, to the integrated ECU 6, for example. The request signal includes a detection value of the sensor 31, for example. The integrated ECU 6 obtains the request signal transmitted from the individual ECU 2, and transmits a control signal generated based on a detection value of the sensor 31, to the individual ECU 2. The individual ECU 2 perform drive control of the actuator 30 based on the control signal transmitted from the integrated ECU 6.

The integrated ECU 6 is a central control apparatus such as a vehicle computer. The integrated ECU 6 communicates with the individual ECUs 2 via the buses 4. The integrated ECU 6 also relays communication between the plurality of individual ECUs 2. The integrated ECU 6 is communicably connected to an external server 100 positioned outside of the vehicle C, via an out-of-vehicle communication apparatus 1 mounted in the vehicle C. The integrated ECU 6 obtains an update program 5 for an individual ECU 2 from the external server 100. The integrated ECU 6 transmits the obtained update program 5 to the individual ECU 2 that is an update target.

The external server 100 is a computer such as a server connected to an external network N such as the Internet or a public network, and includes a storage unit (not shown) constituted by a RAM (Random Access Memory), a ROM (Read Only Memory), a hard disk, or the like. The update program 5 is stored in the storage unit. The integrated ECU 6 may be communicably connected to the out-of-vehicle communication apparatus 1, communicate, via the out-of-vehicle communication apparatus 1, with the external server 100 connected thereto via the external network N, and relay communication between the external server 100 and the individual ECUs 2 mounted in the vehicle C. The update program 5 is stored in a storage unit of the external server 100. When the update program 5 targeted for an individual ECU 2 of the vehicle C is stored, the external server 100 transmits an update notification to the integrated ECU 6.

The out-of-vehicle communication apparatus 1 is a TCU (Telematics Control Unit), for example. The out-of-vehicle communication apparatus 1 includes an out-of-vehicle communication unit (not shown), and an input/output I/F (interface/not shown) for communicating with the integrated ECU 6. The out-of-vehicle communication unit is a communication apparatus for performing wireless communication using a mobile communication protocol such as 4G, LTE (Long Term Evolution/registered trademark), 5G, or WiFi (registered trademark). The out-of-vehicle communication unit transmits/receives data to/from the external server 100 via an antenna 11 connected to the out-of-vehicle communication unit. Communication between the out-of-vehicle communication apparatus 1 and the external server 100 is performed via the external network N such as a public network or the Internet. The input/output I/F is a communication interface for performing, for example, serial communication with the integrated ECU 6. The out-of-vehicle communication apparatus 1 and the integrated ECU 6 communicate with each other via the input/output I/F and a wire harness such as a serial cable connected to the input/output I/F. In the present embodiment, the out-of-vehicle communication apparatus 1 is a separate apparatus from the integrated ECU 6, and is communicably connected to the integrated ECU 6 via the input/output I/F and the like, but the configuration of the out-of-vehicle communication apparatus 1 is not limited to the above example. The out-of-vehicle communication apparatus 1 may be incorporated in the integrated ECU 6 as a constituent element of the integrated ECU 6.

Figure 2:
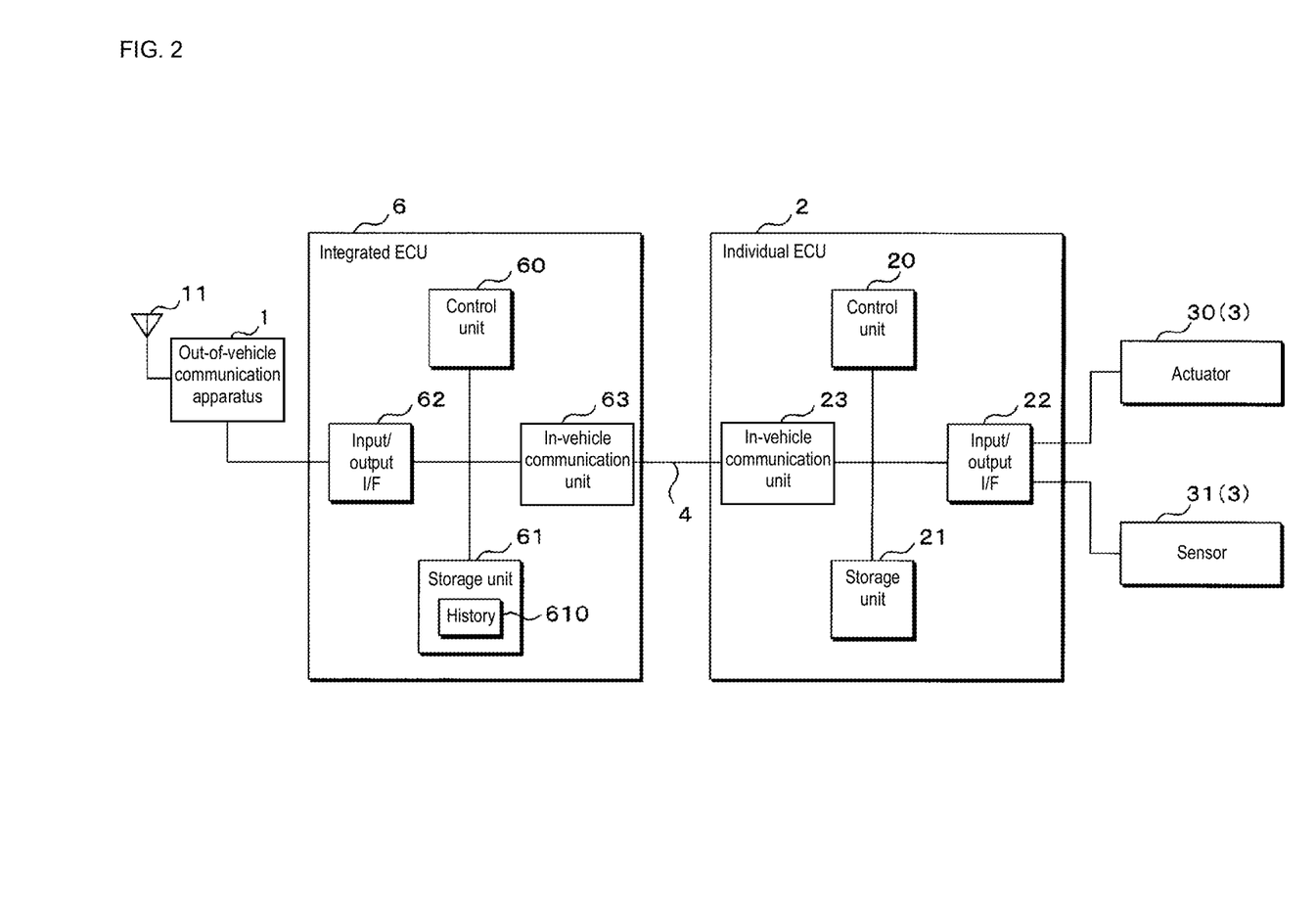
FIG. 2 is a block diagram illustrating internal configurations of an integrated ECU and an individual ECU.

FIG. 2 is a block diagram illustrating internal configurations of the integrated ECU 6 and the individual ECUs 2. The integrated ECU 6 includes a control unit 60, a storage unit 61, an input/output I/F 62, and an in-vehicle communication unit 63. The control unit 60 is a computation processing apparatus such as a CPU (Central Processing Unit) or an MPU (Micro Processing Unit). The control unit 60 performs various types of control processing, calculation processing, and the like by reading out and executing control programs and data stored in the storage unit 61 in advance.

The storage unit 61 is constituted by a volatile memory element such as a RAM (Random Access Memory), or a non-volatile memory element such as a ROM (Read Only Memory), an EEPROM (Electrically Erasable Programmable ROM), or a flash memory. A control program that is executed by the control unit 60, and data that the control unit 60 refers to when performing processing are stored in the storage unit 61 in advance. The control program stored in the storage unit 61 may be a control program read out from a storage medium readable by the integrated ECU 6, and stored. Also, the control program may be a control program downloaded from an external computer (not shown) connected to a communication network (not shown) and, stored in the storage unit 61. A history 610 of a bus load on each bus 4 is stored in the storage unit 61. The history 610 will be described later.

The input/output I/F 62 is a communication interface for performing serial communication, similarly to the input/output I/F of the out-of-vehicle communication apparatus 1, for example. The integrated ECU 6 is communicably connected to the out-of-vehicle communication apparatus 1 via the input/output I/F 62 and the wire harness such as a serial cable.

The in-vehicle communication unit 63 is an input/output interface that uses a CAN (Control Area Network) communication protocol, for example. The control unit 60 mutually communicates with the individual ECUs 2 connected to the buses 4, via the in-vehicle communication unit 63. Note that, in the present embodiment, an example will be described in which the CAN communication protocol is used for communication between the integrated ECU 6 and the individual ECUs 2, but the communication protocol used for communication between the integrated ECU 6 and the individual ECUs 2 is not limited to the CAN communication protocol. The communication protocol used for communication between the integrated ECU 6 and the individual ECUs 2 may be CAN-FD (CAN with Flexible Data Rate) or Ethernet (Ethernet/registered trademark), for example.

Similarly to the integrated ECU 6, each individual ECU 2 includes a control unit 20, a storage unit 21, an input/output I/F 22, and an in-vehicle communication unit 23, and corresponds to an onboard ECU. The control unit 20, the storage unit 21, the input/output I/F 22, and the in-vehicle communication unit 23 of the individual ECU 2 may have the same configurations as the control unit 60, the storage unit 61, the input/output I/F 62, and the in-vehicle communication unit 63 of the integrated ECU 6.

FIG. 2 shows an individual ECU 2 connected to an actuator 30 and a sensor 31, as an example of an individual ECU 2. The onboard device 3 such as the actuator 30 or the sensor 31 is connected to the input/output I/F 22 of the individual ECU 2, using a wire harness such as a serial cable. Although not shown, the display unit 32 and the operating unit 33 are connected, using wire harnesses as serial cables, to the input/output I/F 22 of the individual ECU 2 connected to the display unit 32 and the operating unit 33.

The control unit 20 of the individual ECU 2 obtains a signal output from the onboard device 3 such as the sensor 31 connected to the individual ECU 2, by executing a program stored in the storage unit 21 of the individual ECU 2, and outputs data generated based on the signal, to the integrated ECU 6. In addition, the individual ECU 2 obtains data output from the integrated ECU 6, outputs a signal generated based on the data to the onboard device 3 such as the actuator 30 connected to the individual ECU 2, and performs drive control of the onboard device 3. A program that is executed by the control unit 20 of the individual ECU 2 is updated using the update program 5 transmitted by the integrated ECU 6, as described above. The storage unit 21 is overwritten with the update program 5 as a program of the latest version, for example.

The individual ECUs 2 communicate with each other via the integrated ECU 6 and the buses 4. The integrated ECU 6 transmits the update program 5 to the individual ECUs 2 via the bus 4. As described above, data other than the update program 5 is also transmitted/received between the integrated ECU 6 and the individual ECUs 2 via the buses 4. Frames of data such as control data for controlling the vehicle C, diagnosis data for failure diagnosis of an onboard device 3, and the like are periodically transmitted/received between the integrated ECU 6 and the individual ECUs 2 via the buses 4. Furthermore, when a sudden operation such as sudden braking or sudden control is performed in the vehicle C, an unexpected frame, a so-called event frame, is transmitted/received between the integrated ECU 6 and the individual ECU 2 via the bus 4. Note that the factors that result in an unexpected frame being transmitted/received are not limited to a sudden operation of the vehicle C. While the vehicle C is travelling, a large number of frames of the above data and a large number of unexpected frames are transmitted/received.

The control unit 60 of the integrated ECU 6, for example, periodically detects bus loads on the buses 4 using a known technique. A method for detecting bus loads is a known technique and thus a detailed description thereof is omitted. The largest value of a bus load during a period that excludes a transmission period of the update program 5 is included in the history 610 for each bus 4. The control unit 60 compares a detected bus load with the largest value of bus loads included in the history 610. If the detected bus load is larger than the largest value of bus loads, the control unit 60 updates the history 610. Specifically, the control unit 60 overwrites the history 610 with the detected bus load as the largest value of bus loads.

In the storage unit 61, an upper limit value is set for a bus load on each bus 4. The upper limit value of the bus load is set in advance, for example, when the vehicle C is shipped. In the present embodiment, the upper limit value of the bus load takes a value smaller than a design upper limit value of the bus 4. The set upper limit value of the bus load is also referred to as a "set upper limit value". In the present embodiment, a set upper limit value is set for each bus 4, but a set upper limit value common to the plurality of buses 4 may be set.

The control unit 60 determines whether or not an update notification has been received from the external server 100. If an update notification has been received, the control unit 60 obtains the update program 5 from the external server 100. The control unit 60 specifies an individual ECU 2 that is an update target, based on information regarding the update target. The information regarding the update target is included in the update notification, for example. Alternatively, the information regarding an update target is obtained along with the update program from the external server 100. The control unit 60 transmits the obtained update program 5 as a plurality of frames to the individual ECU 2 that is an update target. Specifically, the control unit 60 derives a transmission cycle of the frames of the update program 5, and periodically transmits the frames of the update program 5 to the individual ECU 2 that is an update target, one frame at a time based on the derived transmission cycle. As a result of all of the plurality of frames of the update program 5 being transmitted to the individual ECU 2, the update program 5 is transmitted to the individual ECU 2. The frames of the update program 5 are so called repro frames.

Commonly, the update program 5 has a large data amount, and thus, in order to quickly transmit the update program 5 to the individual ECU 2, the control unit 60 needs to transmit the frames of the update program 5 to the individual ECU 2 in a short transmission cycle within a range in which the bus load does not exceed the set upper limit value. A method will be described below in which the control unit 60 determines a transmission cycle of the frames of the update program 5.

Upon receiving the update notification from the external server 100, the control unit 60 detects the bus load on the bus 4 connected to the individual ECU 2 that is an update target. Furthermore, the control unit 60 compares the detected bus load with the largest value of bus loads on the above bus 4 included in the history 610. If the detected bus load is larger than the largest value of bus loads included in the history 610, the control unit 60 derives the difference between the detected bus load and the set upper limit value for the bus 4 connected to the individual ECU 2 that is an update target.

If the detected bus load is smaller than or equal to the largest value of bus loads on the above bus 4 included in the history 610, the control unit 60 derives the difference between the set upper limit value for the bus 4 connected to the individual ECU 2 that is an update target, and the largest value of bus loads on the above bus 4 included in the history 610. Hereinafter, the difference between the set upper limit value and the detected bus load, and the difference between the set upper limit value and the largest value of bus loads included in the history 610 are each referred to as a "load difference" without distinguishing them from each other.

Figure 3:
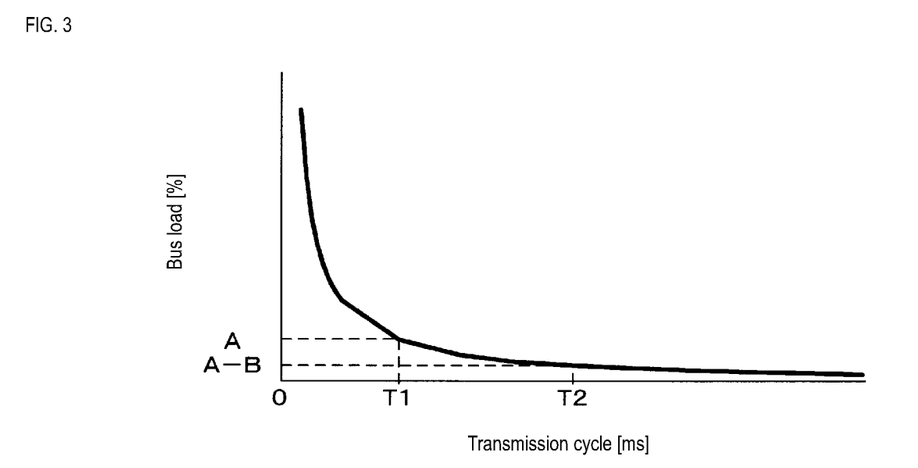
FIG. 3 is a schematic diagram illustrating the relation between bus load and transmission cycle.

The control unit 60 derives a transmission cycle based on the relation between bus load and transmission cycle, and the derived load difference. FIG. 3 is a schematic diagram illustrating the relation between bus load and transmission cycle. In FIG. 3, the horizontal axis indicates transmission cycle [ms], and the vertical axis indicates bus load [%]. Commonly, a transmission cycle when the frames of certain data are transmitted/received and a bus load that occurs on the bus 4 due to transmission/reception of the frames are inversely proportional to each other as shown in FIG. 3. The longer the transmission cycle is, the smaller the bus load becomes. The shorter the transmission cycle is, the larger the bus load becomes. An approximation function of a graph that indicates the inverse relation between bus load and transmission cycle is stored in advance in the storage unit 61 as the relation between bus load and transmission cycle, for example. Note that the units for bus load and transmission cycle are not limited to the above examples.

When the control unit 60 transmits the frames of the update program 5 to the individual ECU 2 via the bus 4, a bus load equivalent to the load difference can be applied to the above bus 4. When the load difference is small, the control unit 60 transmits the frames of the update program 5 to the individual ECU 2 via the bus 4 in a long transmission cycle. When the load difference is large, the control unit 60 transmits the frames of the update program 5 to the individual ECU 2 via the bus 4 in a short transmission cycle.

The control unit 60 derives a transmission cycle in which the bus load equivalent to the derived load difference can be further applied to the above bus 4. A case will be described in which the load difference is A [%]. In the example in FIG. 3, a transmission cycle in which the bus load of A [%] equivalent to the load difference is applied to the bus 4 is T1 [ms]. The control unit 60 derives a transmission cycle of T1 [ms] by using the above-described approximation function and the load difference of A [%]. Note that A is a positive value smaller than 100. T1 is a positive value.

If the detected bus load is larger than the largest value of bus loads included in the history 610, the load difference is the difference between the set upper limit value and the detected bus load, and thus a transmission cycle is derived based on the relation between bus load and transmission cycle, and the difference between the set upper limit value and the detected bus load. In other words, if the detected bus load is larger than the largest value of bus loads, the control unit 60 derives a transmission cycle based on the detected bus load.

If the detected bus load is smaller than or equal to the largest value of bus loads included in the history 610, the load difference is the difference between the set upper limit value and the largest value of bus loads included in the history 610, and thus a transmission cycle is derived based on the relation between bus load and transmission cycle, and the difference between the set upper limit value and the largest value of bus loads included in the history 610. In other words, if the detected bus load is smaller than or equal to the largest value of bus loads, the control unit 60 derives a transmission cycle based on the largest value of bus loads.

A method for deriving a transmission cycle is not limited to the above example. When deriving a transmission cycle, the control unit 60 may take a bus load that occurs on the bus 4 due to an unexpected frame into consideration. A bus load that occurs on the bus 4 due to an unexpected frame is estimated through testing in advance, for example. Hereinafter, a bus load that occurs on the bus 4 due to an unexpected frame and is estimated in advance is also referred to as an "estimated bus load". The estimated bus load is estimated as the difference between the average value of bus loads during any period during which an unexpected frame is transmitted/received, and the average value of bus loads during any period during which no unexpected frame is transmitted/received, for example. The estimated bus load is stored in the storage unit 61. In the present embodiment, an estimated bus load is common to a plurality of buses 4, but an estimated bus load may be stored in the storage unit 61 for each bus 4.

The control unit 60 derives a transmission cycle based on the above-described relation between bus load and transmission cycle, the derived load difference, and the estimated bus load. A case will be described in which the load difference is A [%], and the estimated bus load is B [%]. B is a positive value smaller than 100. The control unit 60 derives a transmission cycle in which a bus load of (A-B) [%] equivalent to the difference between the load difference and the estimated bus load is applied to the bus 4, using the above approximation function. In the example in FIG. 3, the transmission cycle in which the bus load of (A–B) [%] is applied to the bus 4 is T2 [ms]. Note that A-B is larger than 0. T2 is a positive value.

The relation between bus load and transmission cycle stored in the storage unit 61 in advance is not limited to the above approximation function. A function in accordance with which a transmission cycle is output when the detected bus load or the largest value of bus loads included in the history 610 is input may be stored in advance for each bus 4, for example. The function includes, for example, a formula for calculating the difference between an input bus load and a set upper limit value of the bus 4, and a formula of the above approximation function. The control unit 60 inputs the detected bus load or the largest value of bus loads included in the history 610 to the above function, and derives a transmission cycle.

A table in which bus loads and transmission cycles are stored in association with each other may be stored in the storage unit 61 as the relation between bus load and transmission cycle in advance, for example. The control unit derives a transmission cycle based on the detected bus load or the largest value of bus loads included in the history 610, and the stored table.

The control unit 60 calculates a time required for transmitting the update program 5 to the individual ECU 2, based on the derived transmission cycle and the data amount of the update program 5. Hereinafter, the time required for transmitting the update program 5 to the individual ECU 2 is also referred to as a "required time". A data amount for each frame is defined by a communication protocol. According to the CAN communication protocol, the data amount for each frame is eight bytes, for example. When, for example, the communication protocol is the CAN communication protocol, the control unit 60 calculates a required time [min] as: the data amount [byte] of the update program 5/(8 bytes/transmission cycle [ms])×1000/60.

Figure 4:
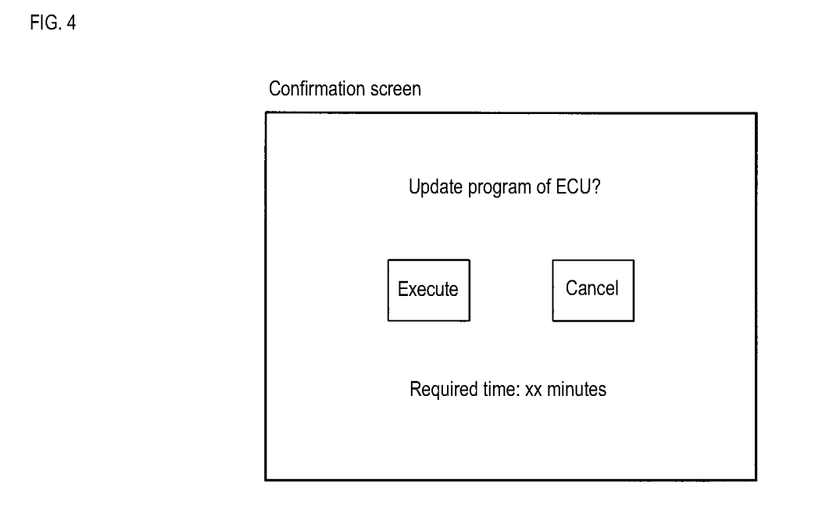
FIG. 4 is a schematic diagram illustrating an example of a confirmation screen.

The control unit 60 causes the display unit 32 to display a confirmation screen that includes the calculated required time, and notifies an occupant such as the driver of the vehicle C of the required time. FIG. 4 is a schematic diagram showing an example of the confirmation screen. The confirmation screen in FIG. 4 includes a required time, text "Do you want to update the program of the ECU?" and an "execute" button and a "cancel" button. The required time calculated by the control unit 60 is displayed as the "required time" on the confirmation screen.

When, for example, causing the display unit 32 to display the confirmation screen, the control unit 60 outputs the calculated required time to the individual ECU 2 connected to the display unit 32. When the output required time is received, the individual ECU 2 generates confirmation screen data for configuring the confirmation screen based on the received required time. The individual ECU 2 outputs the generated confirmation screen data to the display unit 32, and causes the display unit 32 to display the confirmation screen. An occupant such as the driver of the vehicle C is notified of the required time. The confirmation screen data may be generated by the control unit 60 based on the calculated required time. The control unit 60 outputs the generated confirmation screen data to the display unit 32 via the individual ECU 2, and causes the display unit 32 to display the confirmation screen.

An occupant such as the driver of the vehicle C performs an operation on the operating unit 33 using the confirmation screen, and selects the "execute" button or the "cancel" button. The driver presses the "execute" button to cause the integrated ECU 6 to update the program of the individual ECU 2. Specifically, when the "execute" button is pressed, an execution signal is output from the operating unit 33 to the integrated ECU 6. The execution signal indicates to execute transmission of the frames of the update program 5 to the individual ECU 2. When the output execution signal is received, the control unit 60 transmits the frames of the update program 5 to the individual ECU 2 that is an update target, based on the derived transmission cycle. The update program 5 is transmitted to the individual ECU 2 that is an update target, and is applied to the individual ECU 2. That is to say, the program of the individual ECU 2 is updated.

An occupant such as the driver of the vehicle C presses the "cancel" button on the confirmation screen, and causes the integrated ECU 6 to cancel updating of the program of the individual ECU 2. Specifically, when the "cancel" button is pressed, a cancelation signal is output from the operating unit 33 to the integrated ECU 6. The cancellation signal indicates to not execute transmission of the frames of the update program 5 to the individual ECU 2. When the output cancellation signal is received, the control unit 60 does not transmit the update program 5 to the individual ECU 2. Updating of the program of the individual ECU 2 is canceled. The execution signal and the cancellation signal are included in information regarding whether or not to execute transmission of the frames of an update program to an onboard ECU.

Figure 5:
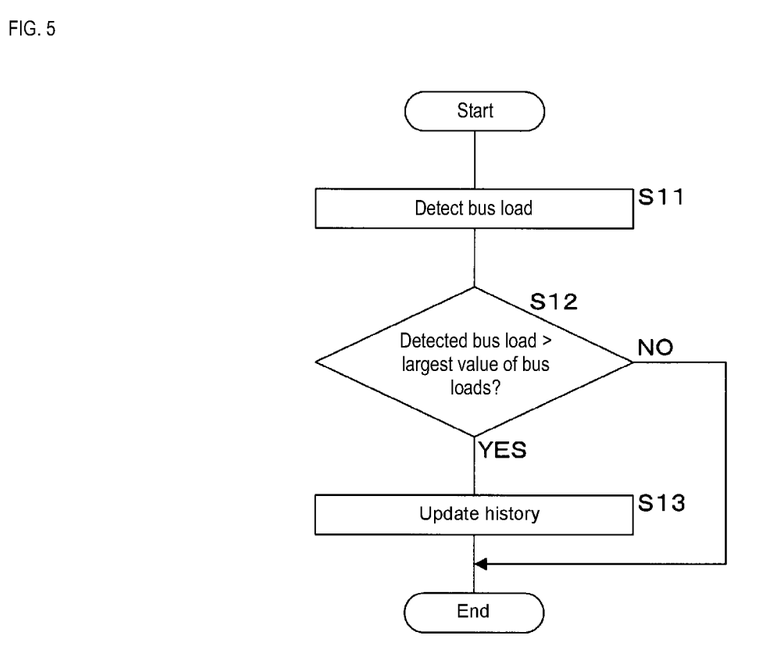
FIG. 5 is a flowchart illustrating processing related to updating of a history, which is performed by a control unit of the integrated ECU.

FIG. 5 is a flowchart illustrating processing related to updating of the history 610, which is performed by the control unit 60 of the integrated ECU 6. When, for example, the IG switch is switched from off to on, the control unit 60 starts the following processing. The control unit 60 irregularly or periodically performs the following processing, for example.

The control unit 60 detects the bus load on the bus 4 (step S11). The control unit 60 determines whether or not the detected bus load is larger than the largest value of bus loads included in the history 610 (step S12). If the detected bus load is smaller than or equal to the largest value of bus loads (step S12: NO), the control unit 60 ends the processing. The control unit 60 may perform the processing of step S11 instead of ending the processing.

If the detected bus load is larger than the largest value of bus loads (step S12: YES), the control unit 60 updates the history 610 (step S13). Specifically, the control unit 60 overwrites the history 610 with the detected bus load as the largest value of bus loads. The control unit 60 ends the processing. The control unit 60 may perform the processing of step S11 instead of ending the processing.

Figure 6:
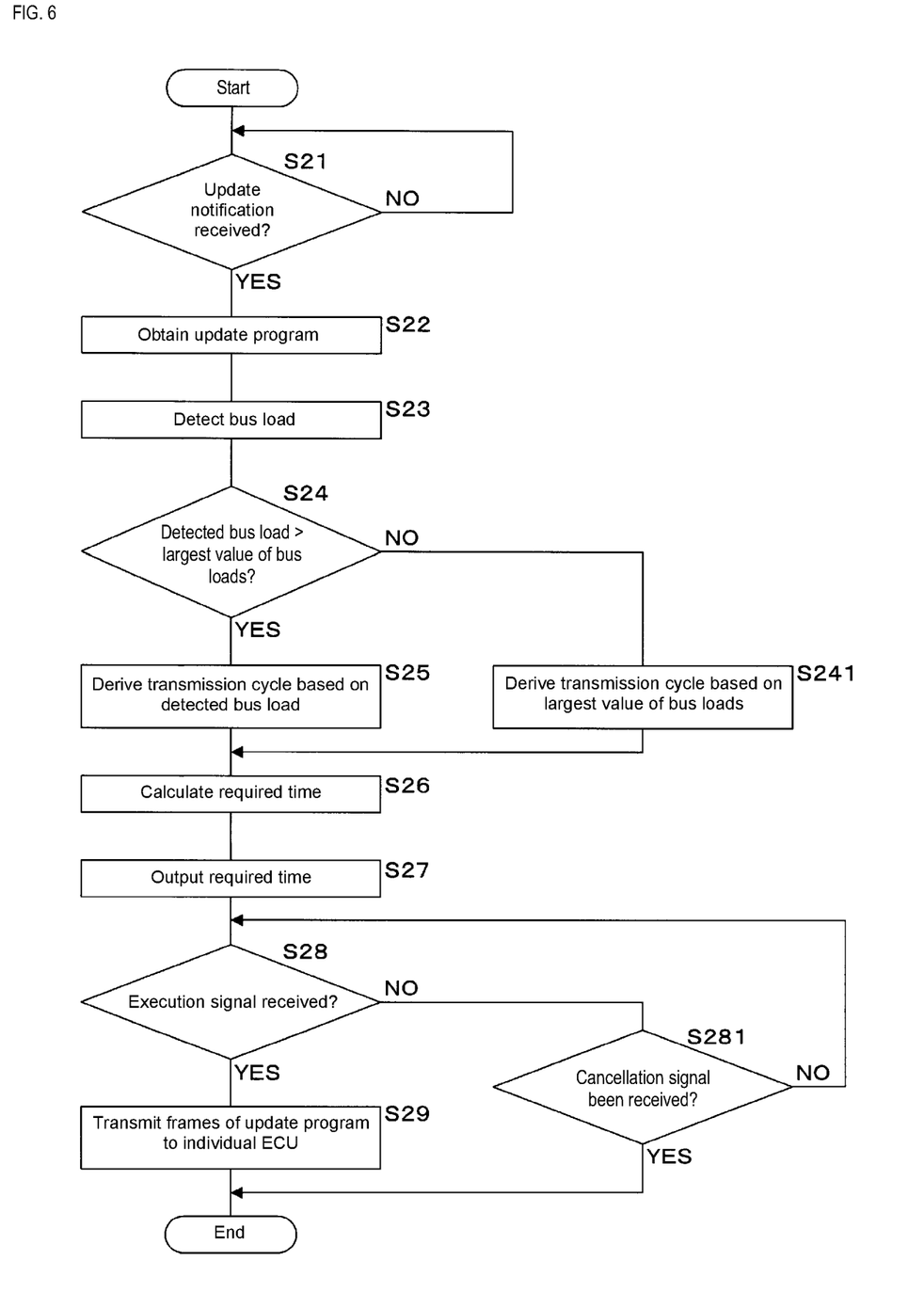
FIG. 6 is a flowchart illustrating processing related to transmission of an update program to an individual ECU that is an update target, the processing being performed by the control unit of the integrated ECU.

FIG. 6 is a flowchart illustrating processing related to transmission of the update program 5 to the individual ECU 2 that is an update target, the processing being performed by the control unit 60 of the integrated ECU 6. When, for example, the IG switch is switched from off to on, the control unit 60 starts the following processing.

The control unit 60 periodically or irregularly communicates with the external server 100 via the out-of-vehicle communication apparatus 1. The control unit 60 determines whether or not an update notification output from the external server 100 has been received (step S21). If an update notification has not been received (step S21: NO), the control unit 60 performs loop processing in order to perform the processing of step S21 again. If an update notification has not been received for a certain time period or longer, the control unit 60 may end the processing.

If an update notification has been received (step S21: YES), the control unit 60 obtains the update program 5 from the external server 100 (step S22). The control unit 60 detects the bus load on the bus 4 connected to the individual ECU 2 that is an update target (step S23). Specifically, the control unit 60 specifies the individual ECU 2 that is an update target, and the bus 4 connected to this individual ECU 2, based on information regarding the individual ECU 2 that is an update target included in an update request signal. The control unit 60 detects the bus load on the specified bus 4. The control unit 60 determines whether or not the detected bus load is larger than the largest value of bus loads included in the history 610 (step S24). Specifically, the control unit 60 refers to a history in the storage unit 61, and compares the largest value of bus loads and the detected bus load on the specified bus 4.

If the detected bus load is larger than the largest value of bus loads (step S24: YES), the control unit 60 derives a transmission cycle based on the detected bus load as described above (step S25), and performs the processing of step S26 to be described later.

If the detected bus load is not larger than the largest value of bus loads (step S24: NO), that is to say, if the detected bus load is smaller than or equal to the largest value of bus loads, the control unit 60 derives a transmission cycle based on the largest value of bus loads as described above (step S241).

As described above, the control unit 60 calculates a required time based on the derived transmission cycle and the data amount of the update program 5 (step S26). As described above, the control unit 60 outputs the calculated required time to the individual ECU 2 connected to the display unit 32 (step S27), and causes the display unit 32 to display the confirmation screen that includes the required time. The control unit 60 may generate confirmation screen data for configuring the confirmation screen that includes the calculated required time, and output the generated confirmation screen data to the display unit 32 via the individual ECU 2. The display unit 32 displays the confirmation screen that includes the required time, and thus the driver is notified of the required time. As described above, by the driver performing an operation on the operating unit 33 using the confirmation screen, an execution signal or a cancellation signal is output to the control unit 60.

The control unit 60 determines whether or not an execution signal has been received (step S28). If an execution signal has not been received (step S28: NO), the control unit 60 determines whether or not a cancellation signal has been received (step S281). If a cancellation signal has been received (step S281: YES), the control unit 60 ends the processing. If a cancellation signal has not been received (step S281: NO), the control unit 60 performs the processing of step S28. If neither an execution signal or a cancellation signal has been received for a certain time period or longer, the control unit 60 may end the processing.

If an execution signal has been received (step S28: YES), the control unit transmits the frames of the obtained update program 5 to the individual ECU 2 that is an update target, based on the derived transmission cycle (step S29). After transmitting all of the frames of the update program 5 to the individual ECU 2 that is an update target, the control unit 60 ends the processing. As a result of the transmitted update program 5 being applied to the individual ECU 2 that is an update target, the program of the individual ECU 2 is updated.

Instead of determining whether or not an update notification has been received, the control unit 60 may communicate with the external server 100 and determine whether or not the update program 5 is prepared in the external server 100. If the update program 5 is prepared in the external server 100, the control unit 60 performs the processing of step S22. If the update program 5 is not prepared in the external server 100, the control unit 60 performs loop processing in order to determine, again, whether or not the update program 5 is prepared in the external server 100.

In the present embodiment, the control unit 60 obtains the update program 5 before determining whether or not an execution signal has been received, but the control unit 60 may obtain the update program 5 when an execution signal is received. In this case, the processing in step S22 is omitted. When calculating a required time, the control unit 60 obtains the data amount of the update program from the external server 100. The data amount of the update program 5 may be included in the update notification. When an execution signal is received, the control unit 60 receives the update program 5. The control unit 60 transmits the frames of the update program 5 to the individual ECU 2 that is an update target, based on the derived transmission cycle.

In the present embodiment, it is possible to notify the driver of the required time as described above, and thus the driver can determine whether or not to execute updating of the program of the individual ECU 2, based on the required time. If, for example, the required time is long, the driver can cancel update by pressing the cancel button on the confirmation screen.

The control unit 60 may determine whether or not an execution signal has been received, without calculating and outputting a required time. After deriving a transmission cycle, the control unit 60 causes the display unit 32 to display a confirmation screen that does not include a required time, instead of performing the processing of steps S26 and S27, for example. When an execution signal is received, the control unit 60 transmits the frames of the update program 5 to the individual ECU 2. It is possible to update the program of the individual ECU 2 if it is permitted by the driver.

Note that, after deriving a transmission cycle, the control unit 60 may transmit the frames of the update program 5 to the individual ECU 2 that is an update target, based on the transmission cycle, without calculating and outputting a required time or determining whether or not an execution signal has been received. In this case, the processing of steps S26, S27, S28 and S281 is omitted.

Data other than the update program 5 is transmitted/received even while the frames of the update program 5 are being transmitted, and thus the bus load changes. The history 610 includes the largest value of bus loads when other data is transmitted/received. In the present embodiment, when deriving a transmission cycle, the integrated ECU 6 detects the bus load, and compares the detected bus load and the largest value of bus loads included in the history 610. If the detected bus load is smaller than or equal to the largest value of bus loads, the integrated ECU 6 derives a transmission cycle using the largest value of bus loads and the relation between bus load and transmission cycle as described above, and transmits the frames of the update program 5 to the individual ECU 2 that is an update target, based on the transmission cycle. Even when the bus load changes due to transmission/reception of other data, the integrated ECU 6 can transmit the frames of the update program 5 to the individual ECU 2 such that the bus load on the bus 4 does not exceed the set upper limit.

If the detected bus load is larger than the largest value of bus loads, the integrated ECU 6 derives a transmission cycle based on the detected bus load, and transmits the frames of the update program 5 to the individual ECU 2 that is an update target, based on the derived transmission cycle. When, for example, a duration of use of the vehicle C is short, it is highly likely that the bus load that is detected is larger than the largest value of bus loads included in the history 610. Even when a duration of use of the vehicle C is short, the integrated ECU 6 can transmit the frames of the update program 5 to the individual ECU 2 such that the bus load on the bus 4 does not exceed the set upper limit due to a change in the bus load caused by transmission/reception of other data.

The integrated ECU 6 transmits the frames of the update program 5 as described above, and thus, even when other data is being transmitted/received, the integrated ECU 6 can transmit the frames of the update program 5 to the individual ECU 2 that is an update target, without being influenced by transmission/reception of other data. In addition, the integrated ECU 6 can transmit the frames of the update program 5 to the individual ECU 2 that is an update target, without influencing transmission/reception of other data. The above influence may cause delay in communication and loss of data or a frame. Even when transmission of an update program and transmission/reception of data other than the update program are performed, the integrated ECU 6 can transmit the update program to an onboard ECU such that the upper limit value of the bus load is not exceeded. Therefore, the integrated ECU 6 can appropriately transmit the update program 5 to the individual ECU 2 that is an update target. While the vehicle C is travelling, a large number of frames of other data and a large number of unexpected frames are transmitted/received via the bus 4. Even while the vehicle C is travelling, the integrated ECU 6 can appropriately transmit the update program 5 to the individual ECU 2 that is an update target. The integrated ECU 6 corresponds to an onboard apparatus. The individual ECU 2 corresponds to an onboard ECU.

The integrated ECU 6 derives a transmission cycle based on the relation between bus load and transmission cycle, and the bus load. The integrated ECU 6 can derive, in accordance with the bus load, a transmission cycle for which a bus load that it is desired to apply to the bus occurs, by using the above relation. In the present embodiment, the integrated ECU 6 derives a transmission cycle using a set upper limit value of a bus load and a detected bus load or the largest value of bus loads. The integrated ECU 6 can transmit the frames of the update program 5 to the individual ECU 2 that is an update target, while effectively utilizing the bus 4 to the set upper limit value of the bus load. The integrated ECU 6 can efficiently transmit the update program 5 to the individual ECU 2.

A transmission cycle is preferably derived based on the relation between bus load and transmission cycle, a bus load, and an estimated bus load. A bus load that occurs on the bus 4 due to an unexpected frame is taken into consideration, and thus the bus 4 has room for transmission/reception of data, namely a so-called margin. Even in a case where, for example, a bus load rapidly increases when a plurality of unexpected frames are transmitted/received at the same time, the integrated ECU 6 can transmit the frames of the update program 5 to the individual ECU 2 such that the bus load on the bus 4 does not exceed the set upper limit value.

In the present embodiment, the set upper limit value of the bus load is set in advance, but the upper limit value of the bus load may be changed as appropriate. The set upper limit value of the bus load can be suitably set as long as it is smaller than or equal to the design upper limit value of the bus 4, but a value smaller than the design upper limit value of the bus 4 as in the above example is preferably set. There is a risk that the bus load will exceed the set upper limit value due to transmission/reception of an unexpected frame while frames are being transmitted, but, if the set upper limit value is smaller than the design upper limit value, it is possible to prevent the bus load from exceeding the design upper limit value when the bus load exceeds the set upper limit value. Note that, when the bus load exceeds the set upper limit value, the integrated ECU 6 may notify the external server 100 that the bus load has exceeded the set upper limit value.

If the set upper limit value is equal to the design upper limit value, and the bus load exceeds the set upper limit value, the bus load also exceeds the design upper limit value. When the bus load exceeds the design upper limit value, there is a risk that frames of the update program 5 transmitted via the bus 4 or frames of other data transmitted/received will be lost. In addition, there is a risk that the frames of the update program 5 will be overwritten with other data or a frame of other data will be overwritten with a frame of the update program 5.

In the present embodiment, the largest value of bus load during a period that excludes a transmission period of the update program 5 is included in the history 610 for each bus 4, but the bus load included in the history 610 is not limited to the largest value. Bus loads during a predetermined period that excludes a transmission period of the update program 5 may be included in the history 610 for each bus 4. The control unit 60 derives a transmission cycle using the largest value of bus loads during the predetermined period or the average value of the bus loads during the predetermined period, for example.

The integrated ECU 6 does not need to obtain the update program 5 from the external server 100. The update program 5 may be recorded in a recording medium readable by the integrated ECU 6, for example. The integrated ECU 6 obtains the update program 5 by reading the recording medium. The control unit derives a transmission cycle of the frames of the obtained update program 5 as described above.

Second Embodiment

Figure 7:
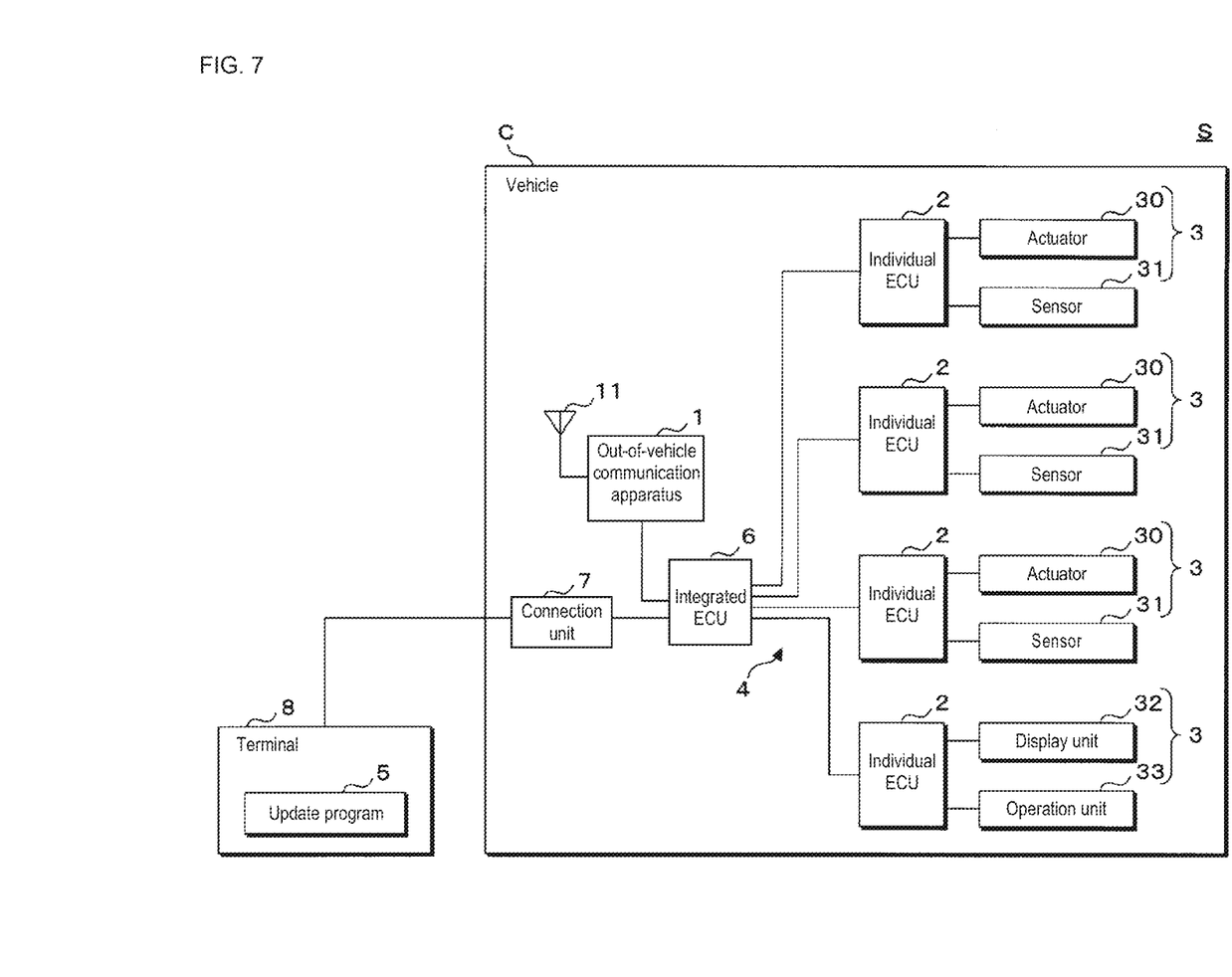
FIG. 7 is a schematic diagram illustrating a system configuration of an onboard system according to a second embodiment.

FIG. 7 is a schematic diagram illustrating a system configuration of an onboard system according to a second embodiment. In the configuration according to the second embodiment, constituent elements similar to those in the first embodiment are given the same reference numerals, and a detailed description thereof is omitted. The onboard system includes an integrated ECU 6 mounted in a vehicle C, a plurality of individual ECUs 2, and onboard devices 3 connected to the individual ECUs 2. The integrated ECU 6 and the individual ECUs 2 are connected via buses 4. The integrated ECU 6, the individual ECUs 2, the onboard devices 3, and the buses 4 are similar to the integrated ECU 6, the individual ECUs 2, the onboard devices 3, and the buses 4 according to the first embodiment, and thus a detailed description thereof is omitted. A storage unit 61 of the integrated ECU 6 stores a history 610.

A connection unit 7 that is connected to a terminal 8 is provided in the vehicle C. The terminal 8 is owned by a worker who performs maintenance work of the vehicle C, for example. The terminal 8 is a diagnostic tool, for example. In the present embodiment, an update program 5 is stored in the terminal 8. The terminal 8 includes a display unit such as a display (not shown). The connection unit 7 is connected to an input/output I/F 62 of the integrated ECU 6. The integrated ECU 6 and the terminal 8 are connected to each other via the connection unit 7.

When the terminal 8 is connected to the integrated ECU 6 and stores the update program 5, the terminal 8 outputs an update notification to the integrated ECU 6. The terminal 8 also transmits the update program 5 to the integrated ECU 6. The terminal 8 obtains a transmission cycle output from the integrated ECU 6. The terminal 8 calculates a required time based on the obtained transmission cycle and the data amount of the update program 5. A method for calculating a required time is similar to that in the first embodiment, and thus a detailed description thereof is omitted. Note that the update program 5 is stored in the terminal 8, and thus the terminal 8 can obtain the data amount of the update program 5. The terminal 8 displays a confirmation screen that includes the calculated required time, on a display unit of the terminal 8. The worker is notified of the required time.

The worker performs an operation on the terminal 8 using the confirmation screen, and selects an "execute" button or a "cancel" button. If the "execute" button is selected, the terminal 8 transmits an execution signal to the integrated ECU 6. If the "cancel" button is selected, the terminal 8 transmits a cancellation signal to the integrated ECU 6.

The control unit 60 of the integrated ECU 6 receives an update notification from the terminal 8. When the update notification is received, the control unit 60 obtains the update program 5 from the terminal 8, and derives a transmission cycle similarly to the first embodiment. The control unit 60 outputs the derived transmission cycle to the terminal 8.

When the execution signal output from the terminal 8 is received, the control unit 60 transmits the frames of the update program 5 to the individual ECU 2 that is an update target, based on the derived transmission cycle. The program of the individual ECU 2 is updated. When the cancellation signal output from the terminal 8 is received, the control unit 60 does not obtain the update program 5. The program of the individual ECU 2 is not updated.

Figure 8:
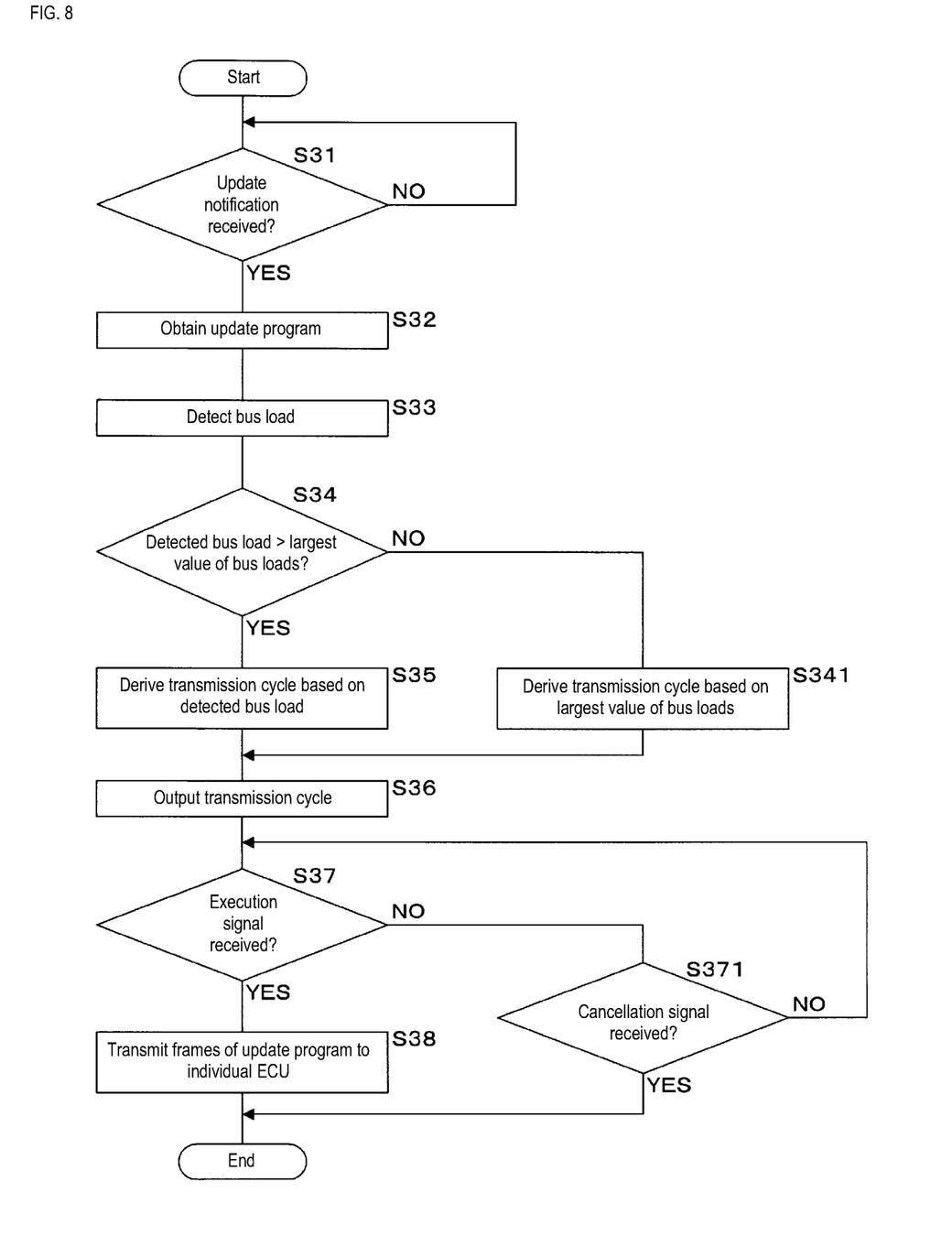
FIG. 8 is a flowchart illustrating processing related to transmission of an update program to an individual ECU that is an update target, the processing being performed by a control unit of an integrated ECU according to the second embodiment.

FIG. 8 is a flowchart illustrating processing related to transmission of the update program 5 to the individual ECU 2 that is an update target, the processing being performed by the control unit 60 of the integrated ECU 6 according to the second embodiment. The control unit 60 starts the following processing when the terminal 8 is connected to the connection unit 7, for example.

The control unit 60 determines whether or not an update notification output from the terminal 8 has been received (step S31). If an update request signal has not been received (step S31: NO), the control unit 60 performs loop processing in order to perform the processing of step S31 again. If an update request signal has not been received for a certain time period or longer, the control unit 60 may end the processing.

If an update notification has been received (step S31: YES), the control unit 60 obtains the update program 5 from the terminal 8 (step S32), and performs the processing of steps S33 and S34. The processing of steps S33 and S34 is similar to the processing of steps S23 and S24 in the first embodiment, and thus a detailed description thereof is omitted. If the detected bus load is larger than the largest value of bus loads (step S34: YES), the control unit 60 derives a transmission cycle based on the detected bus load similarly to the first embodiment (step S35), and performs the processing of step S36, which will be described later.

If the detected bus load is not larger than the largest value of bus loads (step S34: NO), that is to say, if the detected bus load is smaller than or equal to the largest value of bus loads, the control unit 60 derives a transmission cycle based on the largest value of bus loads similarly to the first embodiment (step S341).

The control unit 60 outputs the derived transmission cycle to the terminal 8 (step S36). The terminal 8 receives the output transmission cycle, and calculates a required time based on the received transmission cycle and the data amount of the update program 5. The terminal 8 displays a confirmation screen that includes the calculated required time, on the display unit of the terminal 8, and notifies the worker of the required time. An execution signal or a cancellation signal is output to the control unit 60 in accordance with an operation on the terminal 8 performed by the worker.

The control unit 60 determines whether or not an execution signal has been received (step S37). If an execution signal has not been received (step S37: NO), the control unit 60 determines whether or not a cancellation signal has been received (step S371). If a cancellation signal has been received (step S371: YES), the control unit 60 ends the processing. If a cancellation signal has not been received (step S371: NO), the control unit 60 performs the processing of step S37. If neither an execution signal or a cancellation signal has not been received for a certain time period or longer, the control unit 60 may end the processing.

If an execution signal has been received (step S37: YES), the control unit 60 transmits the frames of the obtained update program 5 to the individual ECU 2 that is an update target, based on the derived transmission cycle (step S38). After transmitting all of the frames of the update program 5 to the individual ECU 2 that is an update target, the control unit 60 ends the processing. The program of the individual ECU 2 is updated.

In the present embodiment, the integrated ECU 6 outputs a transmission cycle to the terminal 8. The terminal 8 calculates a required time, and causes the display unit of the terminal 8 to display a confirmation screen that includes the calculated required time. It is possible to notify the worker who is carrying the terminal 8 of the required time. The worker can determine whether or not to update the program of the individual ECU 2, based on the required time. The program of the individual ECU 2 is updated if it is permitted by the worker. Since the terminal 8 calculates a required time, the integrated ECU 6 does not need to calculate a required time. It is possible to reduce (the amount of) processing that is performed by the integrated ECU 6.

When, for example, an execution signal is received, the integrated ECU 6 may obtain the update program 5, and transmit the frames of the obtained update program 5 to the individual ECU 2 that is an update target, based on the derived transmission cycle. In addition, the integrated ECU 6 may calculate a required time similarly to the first embodiment, and output the calculated required time to the terminal 8. At this time, when calculating a required time, the integrated ECU 6 communicates with the terminal 8, and obtains the data amount of the update program 5. The update request signal output from the terminal 8 may include the data amount of the update program 5. The terminal 8 causes the display unit of the terminal 8 to display a confirmation screen that includes the required time output from the integrated ECU 6.

The embodiments disclosed herein are examples in all respects and should not be interpreted as limiting in any manner. The scope of the present disclosure is defined not by the foregoing meanings, but is defined by the claims and intended to include all modifications within the meaning and scope equivalent to the claims.

The invention claimed is:

1. An onboard apparatus that performs processing for updating a program of an onboard ECU that is mounted in a vehicle, the onboard apparatus comprising:
a control unit configured to control transmission of a frame of an update program to the onboard ECU; and
a storage unit configured to store a history of a bus load on a bus for transmitting the frame of the update program to the onboard ECU,
wherein the control unit determines whether or not a detected bus load is larger than the largest value of bus load in the history, and derives, based on the history, a first transmission cycle and a second transmission cycle, for transmitting the frame of the update program to the onboard ECU, before the frame of the update program is transmitted, wherein the first transmission cycle is based on the detected load and the second transmission cycle is based on the largest value of bus load stored in the history, and
transmits the frame of the update program to the onboard ECU using the first transmission cycle when the detected bus load is greater than the largest value of bus load in the history and using the second transmission cycle when the detected bus load is smaller than the largest value of bus load in the history.

2. The onboard apparatus according to claim 1, wherein the control unit derives the transmission cycle based on the bus load and a relation between bus load and transmission cycle stored in advance.

3. The onboard apparatus according to claim 2, wherein the control unit derives the transmission cycle based on the bus load, an estimated bus load estimated to occur due to transmission/reception of an unexpected frame other than the frame of the update program, and the relation.

4. The onboard apparatus according to claim 1, wherein the control unit detects the bus load,
   compares the detected bus load with the bus load included in the history,
   derives the transmission cycle based on the detected bus load if the detected bus load is larger than the bus load included in the history, and
   derives the transmission cycle based on the bus load included in the history if the detected bus load is smaller than or equal to the bus load included in the history.

5. The onboard apparatus according to claim 1, wherein the history includes a largest value of the bus load during a period that excludes a transmission period of the frame of the update program, and
   the control unit derives the transmission cycle based on the largest value.

6. The onboard apparatus according to claim 1, wherein the control unit calculates a time required for transmitting the update program to the onboard ECU, based on a data amount of the update program and the derived transmission cycle, and
   causes a display unit provided in the vehicle to display the calculated time.

7. The onboard apparatus according to claim 1, wherein the control unit outputs the derived transmission cycle to a terminal that calculates a time required for transmitting the update program to the onboard ECU, based on the data amount of the update program and the transmission cycle.

8. The onboard apparatus according to claim 1, wherein the control unit obtains information regarding whether or not to execute transmission of the frame of the update program to the onboard ECU, and,
   in accordance with the received information regarding whether or not to execute transmission of the frame of the update program to the onboard ECU, executes transmission of the frame of the update program to the onboard ECU, or cancels transmission of the frame of the update program to the onboard ECU.

9. An updating method comprising:
   storing a history of bus loads on a bus;
   detecting a bus load on a bus;
   deriving a first transmission cycle and a second transmission cycle for transmitting a frame of an update program to an onboard ECU, before transmitting the frame of the update program, wherein the first transmission cycle is based on the detected load and the second transmission cycle is based on the largest value of bus load stored in the history, and
   transmitting the frame of the update program to the onboard ECU using first transmission cycle when the detected bus load is greater than the largest value of bus load in the history and using the second transmission cycle when the detected bus load is smaller than the largest value of bus load in the history.

* * * * *